United States Patent [19]
Hohol

[11] Patent Number: 4,909,545
[45] Date of Patent: Mar. 20, 1990

[54] COUPLING

[76] Inventor: Larry Hohol, 741 Hazel St., Wilkes-Barre, Pa. 18706

[21] Appl. No.: 6,308

[22] Filed: Jan. 15, 1987

Related U.S. Application Data

[63] Continuation of Ser. No. 450,095, Dec. 15, 1982, abandoned.

[51] Int. Cl.[4] ............................................. F16L 35/00
[52] U.S. Cl. ...................................... 285/39; 285/174; 285/360
[58] Field of Search ............... 285/361, 396, 402, 360, 285/39, 174

[56] References Cited

U.S. PATENT DOCUMENTS

| | | | |
|---|---|---|---|
| 149,728 | 4/1874 | Diehl et al. | 285/361 X |
| 177,729 | 5/1876 | Loving | 285/396 |
| 1,083,120 | 12/1913 | May . | |
| 1,117,762 | 11/1914 | Barcus | 285/361 X |
| 1,181,060 | 4/1916 | Bennett | 285/361 X |
| 1,279,935 | 9/1918 | Sweat . | |
| 1,307,273 | 6/1919 | Salley | 285/361 |
| 1,591,871 | 7/1926 | Heinrich . | |
| 1,885,321 | 11/1932 | Benn | 285/361 X |
| 1,890,011 | 12/1932 | Wirz et al. . | |
| 1,913,971 | 6/1933 | Benn . | |
| 2,382,348 | 8/1945 | Taylor | 285/361 X |
| 2,421,228 | 5/1947 | White | 285/361 X |
| 2,532,773 | 12/1950 | Kellam . | |
| 2,532,773 | 12/1950 | Kellam | 285/361 X |

FOREIGN PATENT DOCUMENTS

| | | | |
|---|---|---|---|
| 866276 | 2/1953 | Fed. Rep. of Germany . | |
| 2006115 | 8/1970 | Fed. Rep. of Germany | 285/361 |
| 7500599 | 5/1975 | Fed. Rep. of Germany . | |

*Primary Examiner*—Thomas F. Callaghan
*Attorney, Agent, or Firm*—Wegner & Bretschneider

[57] ABSTRACT

A coupling for joining two hoses, or the like, together is disclosed having a generally cylindrical male member adapted for connection to a hose on one end and on the other end having one or more pins extending radially outward from the surface thereof and a generally cylindrical female member adapted for cooperative engagement with the male member, the female member having one end adapted for connection with a hose and a second end having one or more slots for accepting the pins of the male member. The slots of the female member each having a locking recess for maintaining the pins of the male member within the recess upon coupling, an opening expanding toward the second end of the female member and a channel connecting the recess with the opening. The channel is provided with generally parallel sides between the recess and the opening, the sides of the opening extending outwardly at an angle from the general direction of the sides of the channel thereby forming an opening increasingly wider at its mouth to facilitate the nesting of each pin into each slot upon coupling.

4 Claims, 1 Drawing Sheet

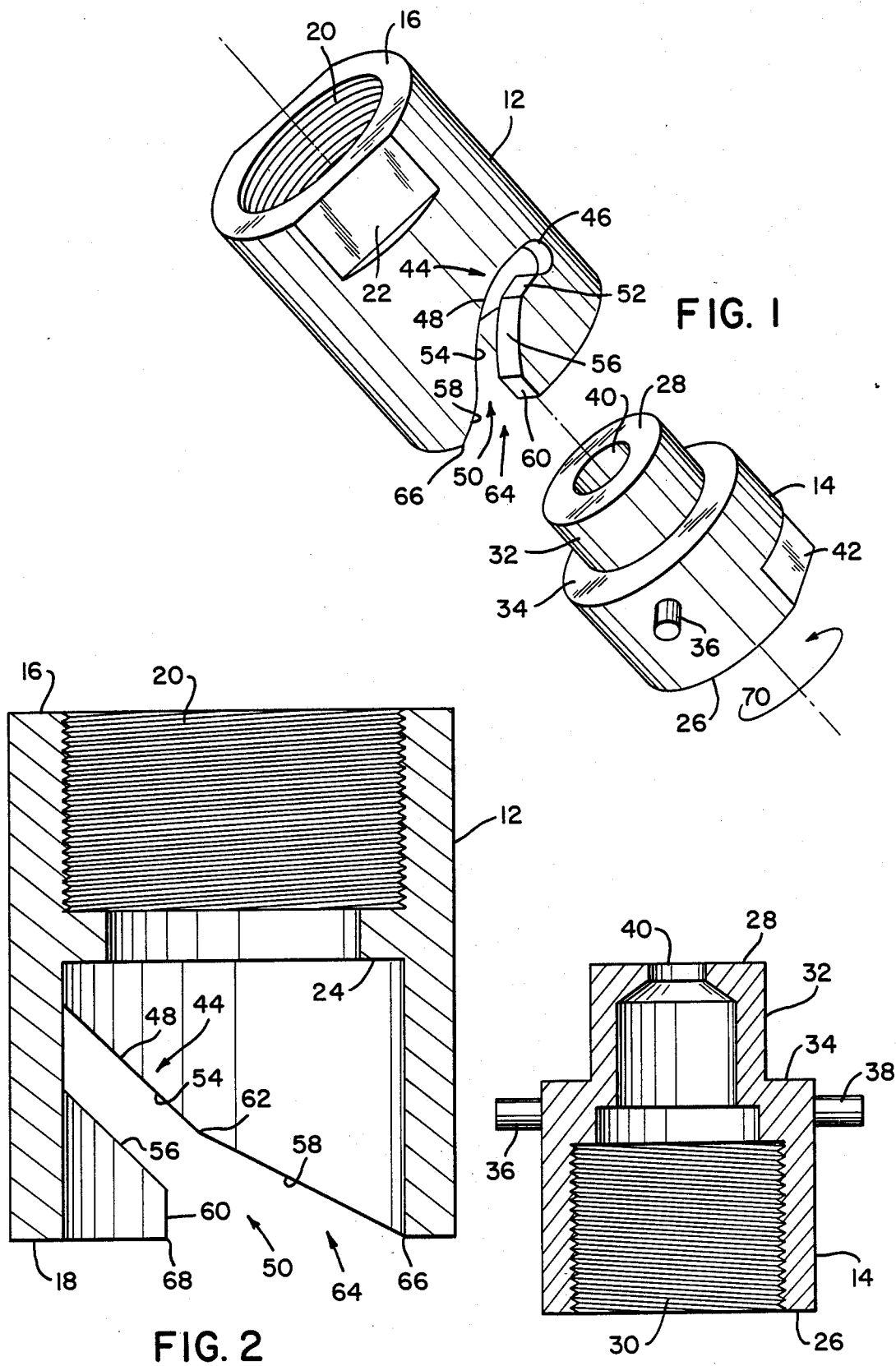

COUPLING

This application is a continuation of U.S. application Ser. No. 450,095, filed Dec. 15, 1982 and now abandoned.

FIELD OF THE INVENTION

The instant coupling relates generally to quickly and easily operated, yet secure couplings between two hoses, or the like, which may carry a fluid or a gas. The instant coupling is of a bayonet type and is most often used for connecting air hoses, but need not be limited to air hoses.

DESCRIPTION OF THE PRIOR ART

Quick release and quick latching couplings of the bayonet-type, are well-known in the field of providing couplings between a pipe, tube or hose of an oxygen tank and a pipe, tube or hose leading to an apparatus which administers oxygen to a patient. Often it is necessary for the patient himself to couple and uncouple the oxygen hose to and from the administering apparatus. Because of the need to have a secure coupling to maintain the integrity of the oxygen path, such couplings are often difficult to operate. In fact, in most cases, the patients which use this type of coupling are elderly or feeble, thus making any difficulty encountered in coupling or uncoupling to be undesirable if not unacceptable.

Many times, such problems occur when a weak or elderly patient tries to couple a normal bayonet-type coupling, by lining up the pin in one half of the coupling with the slot of the other half. This becomes difficult for some patients and for the weakest and most elderly it is often impossible.

BRIEF SUMMARY OF THE INVENTION

The instant invention overcomes problems encountered in the known bayonet-type mount by allowing easier coupling of the male and female members. The wide openings of the slots in the female member allow easy registration with the pins extending from the male member upon coupling. This enables even a weak of feeble patient to quickly and easily perform the registration of the pins with the slots to lock the members of the coupling together.

The coupling of the instant invention requires a generally cylindrical male member having a first and a second end, said first end adapted for connection to a pipe, tube, hose or the like, said male member also having one or more pins extending radially outward from the surface thereof; and a generally cylindrical female member adapted for cooperative engagement with said male member, said female member having one end adapted for connection with a pipe, tube, hose or the like and a second end having one or more slots for accepting said pins of said male member. Each of said slots extend from said second end generally in the direction of said one end, but being at an angle with respect to the axis of said female member, and each slot having a locking recess, an opening, expanding toward said second end, and a channel connecting said recess with said opening. Said locking recess is adapted for compatibly receiving one of said pins and has a lip disposed between said channel and said recess for maintaining one of said pins within said recess upon coupling, with said channel leading from said recess to said opening having generally parallel sides for guiding one of said pins to said recess upon coupling, and said opening having sides extending outwardly at an angle from the general direction of the sides of said channel to form an opening growing increasingly wider toward said second end and being wider than said channel to facilitate the nesting of said pins into the slot upon coupling. The sides of said opening may be straight and divergent such that they form compound angles with the straight sides of said channel with respect to the axis of said female member such that a divergent opening is formed of straight sides and being of greater width than said channel.

BRIEF DESCRIPTION OF THE DRAWINGS

FIG. 1 is a perspective view of the male and female members of the instant coupling.

FIG. 2 is a cross-sectional view of the female member of the coupling as shown in FIG. 1.

FIG. 3 is a cross-sectional view of the male member of the coupling as shown in FIG. 1.

DETAILED DESCRIPTION OF THE INVENTION

As best seen in FIG. 1 the coupling 10 according to the instant invention has a generally cylindrical female member 12 and a generally cylindrical male member 14. Female member 12 has one end 16 and second end 18. The interior of the one end 16 has threads 20 for connection with a suitably threaded pipe, tube, hose or the like (not shown). Opposing flat faces 22 are provided near end 16 to allow the gripping by a wrench or some other tool for facilitating the connection of female member 12 with a pipe, tube, hose or the like (not shown). As seen in FIG. 2 an annular shoulder 24 is provided extending inwardly from the interior of member 12 to provide a support for gaskets or washers (not shown) to be positioned on either side thereof.

As shown in FIGS. 1 and 3 male member 14 has a first end 26 and a second end 28, male member 14 is provided with threads 30 on its interior near end 26 for connecting with complimentary threads of a pipe, tube, hose or the like (not shown). Cylindrical male member 14 also has a smaller cylindrical portion 32 adjacent end 28, thus forming an annular shoulder 34. A pair of opposing pins 36 and 38 extend radially outward from the surface of cylindrical male member 14 near shoulder 34, spaced toward end 26. Aperture 40 is provided in member 14 to allow the flow of gas or liquid therethrough. Additionally, opposing flat faces 42 are provided adjacent end 26 as a gripping point for a wrench or some other tool for facilitating the connection of male member 14 with a threaded pipe, tube, hose or the like (not shown).

Female member 12 is provided with opposing slots 44 (one on each side of member 12) for engagement with pins 36, 38 of male member 14 upon coupling. As shown in FIG. 1 and FIG. 2, slots 44 are comprised of locking recess 46, channel 48, and opening 50. Locking recess 46 is shaped for compatible engagement with pin 36 or 38. Lip 52 is provided between recess 46 and channel 48 for maintaining pin 36 or 38 in the recess 46 upon coupling of the two members. Channel 48 which connects locking recess 46 with opening 50 has sides 54 and 56. These sides are generally parallel with each other for guiding pin 36 or 38 from opening 50 to locking recess 46. Sides 54 and 56 are spaced apart a distance slightly greater than the diameter of pins 36 and 38 for easy movement of the pins therethrough without a great amount of free play. Opening 50 is composed of sides 58 and 60. Sides 58 and 60 each extend outwardly, at an angle, from the general direction of the sides 54 and 56 of channel 48. Sides 58 and 60 are nearest each other at a point 62 which marks the transition from channel 48 to opening 50. From this near point 62, the sides 58 and 60 extend outwardly to form an ever-increasingly wider opening, substantially larger at its mouth 64, as bounded by points 66 and 68 than at point 62. Mouth 64 is substantially wider than the width of channel 48.

In operation, female member 12 is threadably connected by threads 20 to a pipe, tube, hose or the like and male member 14 is threadably connected by threads 30 to another pipe, tube, hose or the like (not shown). As a user proceeds to connect female member 12 with male member 14, the most difficult task is to properly align pins 36 and 38 with slots 44 to couple the two members. Usually, each member would be grasped in a hand of the patient connecting it. As female member 12 is engaged with male member 14, member 14 is rotated until pins 36 and 38 register with mouth 64 of opening 50. This relative rotation may be either clockwise or counter-clockwise to establish the registration of pins 36 and 38 with slots 44. As female member 12 and male member 14 are engaged by a pushing together and causing male member 14 to rotate in the direction of arrow 70 with respect to female member 12, pins 36 and 38 are guided from opening 50 into channel 48 and from there into locking recess 46 thereby forming a secure coupling. The width of mouth 64 is ideally more than twice the width of channel 48 (but need not necessarily be twice the size, but for proper functioning it must be larger) thereby making it much simpler for aged or weak patients to find the registration of pins 36 and 38 with slots 44 and couple the two members together.

I claim:
1. A coupling, comprising:
   (a) a generally cylindrical male member having
      a passageway extending along its axis,
      two or more pins extending radially outward from its surface,
      a first end adapted for connection to a hose or the like, and
      a second end of smaller diameter than said first end and defining an annular shoulder on said first end; and
   (b) a generally cylindrical female member adapted for cooperative engagement with said male member, said female member having
      a passageway extending along its axis of greater diameter than said second end of said male member,
      a first end adapted for connection with a hose or the like, and
      a second end having two or more slots each for accepting one of said pins of said male member, each of said slots extending from said second end and having
         a locking recess adapted for compatibly receiving one of said pins,
         an opening expanding toward a second end wall,
         a channel connecting said recess with said opening, said channel having straight generally parallel sides and being disposed at an angle with respect to the axis of the female member, and
         a flat lip disposed between said channel and said recess for maintaining said pin within said recess upon coupling,
      wherein the sides of said opening are straight and diverge to form compound angles with the straight sides of said channel, one side of said opening being essentially perpendicular to the second end wall and the other side forming an acute angle with respect to the second end wall so that said opening is at least twice as wide as said channel.

2. The coupling of claim 1, wherein the interior of said first end of said male member and the interior of said end of said female member are both threaded for connection with threaded hose couplings.

3. The coupling of claim 1, wherein said female member has opposing flat faces near said first end for facilitating the connection of a hose or the like therewith.

4. The coupling of claim 1, wherein the passageway of said female member has an annular shoulder which cooperates with the annular shoulder of said male member to support a gasket therebetween.

* * * * *